United States Patent
Nies

(10) Patent No.: US 10,693,352 B2
(45) Date of Patent: Jun. 23, 2020

(54) STATORS FOR ELECTRICAL MACHINES

(71) Applicant: GE Energy Power Conversion Technology Ltd, Rugby, Warwickshire (GB)

(72) Inventor: Jacob Thomas Nies, Salzbergen (DE)

(73) Assignee: GE Energy Power Conversion Technology LTD., Warwickshire (GB)

( * ) Notice: Subject to any disclaimer, the term of this patent is extended or adjusted under 35 U.S.C. 154(b) by 334 days.

(21) Appl. No.: 15/611,024

(22) Filed: Jun. 1, 2017

(65) Prior Publication Data

US 2017/0353089 A1     Dec. 7, 2017

(51) Int. Cl.
| | |
|---|---|
| *H02K 1/20* | (2006.01) |
| *H02K 15/02* | (2006.01) |
| *H02K 15/12* | (2006.01) |
| *H02K 1/14* | (2006.01) |

(52) U.S. Cl.
CPC .............. *H02K 15/02* (2013.01); *H02K 1/146* (2013.01); *H02K 1/20* (2013.01); *H02K 15/12* (2013.01)

(58) Field of Classification Search
CPC ....... H02K 1/20; H02K 9/00–28; H02K 15/12
See application file for complete search history.

(56) References Cited

U.S. PATENT DOCUMENTS

| | | |
|---|---|---|
| 4,365,178 A | 12/1982 | Lenz |
| 4,691,131 A | 9/1987 | Nakano |
| 8,201,316 B2 | 6/2012 | Rippel et al. |
| 2012/0131882 A1 | 5/2012 | Sporn et al. |
| 2014/0183989 A1 | 7/2014 | Lenschow |

FOREIGN PATENT DOCUMENTS

| | | |
|---|---|---|
| DE | 197 16 759 A1 | 10/1998 |
| DE | 10 2014 220 510 A1 | 4/2016 |
| EP | 3 079 239 A1 | 10/2016 |
| WO | 03/094323 A1 | 11/2003 |

OTHER PUBLICATIONS

Combined Search and Examination Report issued in connection with corresponding GB Application No. GB1609559.8 dated Nov. 5, 2016.
Extended European Search Report and Opinion issued in connection with corresponding IT Application No. 17171520.4 dated Oct. 12, 2017.

*Primary Examiner* — Ramon M Barrera
(74) *Attorney, Agent, or Firm* — Wood IP LLC

(57) ABSTRACT

A stator for an electrical machine is described. The stator includes a plurality of axially adjacent generally annular laminations. An axially extending coolant passageway through which a coolant fluid flows in use, extends through the stator. A plurality of axially spaced sealing recesses are provided. Each sealing recess is located between a pair of laminations and is in open communication with the surface of the axially extending coolant passageway. Each sealing recess has an axial width greater than the gap between the facing planar surfaces of axially adjacent laminations and is at least partially filled with a cured resin material to define a plurality of axially spaced seals.

16 Claims, 26 Drawing Sheets

STATORS FOR ELECTRICAL MACHINES

BACKGROUND TO THE INVENTION

The present invention relates to stators for electrical machines (e.g., motors and generators), and in particular to stators that have coolant passageways or ducts.

It is known to produce laminated stators for electrical machines by pressing stacks of annular laminations together. The laminations are typically formed from sheets of electrical grade steel which are usually provided with insulating coatings. Each annular lamination may be formed of a single member or may itself be of segmental construction with the segments abutted against each other e.g., at generally radially extending edges.

The laminations can define axially extending teeth that define therebetween axially extending slots for receiving the conductors of a stator winding. The teeth are circumferentially spaced around the stator surface and carry the magnetic flux that links from the stator to the rotor across the airgap. The conductors are electrically insulated from the teeth.

One of the problems faced by designers of electrical machines is the heat that is created as a result of the various losses, e.g., resistive losses in the stator winding, eddy current losses in the laminations etc. The problem of heat can be particularly acute when trying to design an electrical machine with high power density. The maximum power output of an electrical machine, for a given amount of conductive material (e.g., copper for the stator winding conductors and iron for the magnetic circuit) is limited by the efficiency of the cooling because, if heat is not removed efficiently, the temperature of the electrical machine will increase to a point that can cause the insulation material or some other part of the machine to fail.

Electrical machines can be cooled in a variety of different ways, e.g., direct liquid or air cooling, cooling by conduction to the laminations which are in turn cooled by direct cooling or an external water jacket. In one arrangement, the stator can include one or more axially extending coolant passageways (or ducts) through which a coolant fluid flows in use. Each lamination can have one or more opening formed therein, each opening defining part of an axially extending coolant passageway when the laminations are stacked together. When the stacked laminations are compressed and subjected to appropriate treatment including vacuum pressure impregnation (VPI) and curing, each coolant passageway should be fluid tight over the operational lifetime of the electrical machine. In one arrangement, the surface of each coolant passageway is defined by the surfaces of the aligned lamination openings such that the coolant fluid is in direct contact with the stacked laminations. The shape of each coolant passageway is determined by the shape of the corresponding opening in the laminations. The coolant passageways can have any suitable shape, e.g., a cross section that is substantially circular, oval, rectangular or polygonal, or something more complex such as a star shape which increases the surface area of the coolant passageways and thereby increases the transfer of heat from the stator to the coolant fluid. The shape of the coolant passageways can also be designed to increase heat transfer by promoting turbulent flow of the coolant.

The coolant passageways can be located in the main body of the stator, i.e., the part of the stator core from which the stator teeth extend, or in the stator teeth themselves which is where most of the heat is created during operation of the electrical machine.

During a VPI process, the assembled stator core, which can be pre-heated in a separate process to remove moisture, is placed in a vacuum tank. A suitable resin material (e.g., epoxy) is introduced into the vacuum tank while a vacuum is maintained. The vacuum is held for a period of time before being released. The VPI process fills the gaps between the laminations and bonds the laminations together to form a bonded stator core. After impregnation, the resin material is cured in an oven. The stator core forms part of the stator of the electrical machine.

In practice, the coolant passageways can sometimes be prone to leakage of the coolant fluid even after VPI treatment. In particular, deformations within the stator core can lead the resin material between adjacent laminations to crack. Such deformations can be caused by temperature changes as the electrical machine heats up and cools down during normal operation, or by mechanical loading or vibration, for example. Accordingly, there is a need for an improved way of sealing the coolant passageways to prevent leakage of coolant fluid.

SUMMARY OF THE INVENTION

An embodiment of the present invention provides a stator for an electrical machine, said stator comprising a plurality of axially adjacent generally annular laminations (e.g., stacked to define a stator core), a substantially axially extending coolant passageway (or duct) through which a coolant fluid flows in use, and a plurality of axially spaced sealing recesses, wherein each sealing recess is in open communication with the surface of the axially extending coolant passageway, has an axial width greater than the gap between the facing planar surfaces of axially adjacent laminations, and is at least partially filled with a cured resin material, e.g., a resin material that is impregnated into the stator during a vacuum pressure impregnation (VPI) process and subsequently cured. The cured resin material in the sealing recesses defines a plurality of axially spaced seals that are designed to prevent leakage of the coolant fluid between the laminations.

It will be readily appreciated that the planar surfaces of the laminations are not perfectly flat, and that a narrow gap or void will normally be present between the facing planar surfaces of axially adjacent laminations as a result of localised deformities or irregularities in the individual laminations. Such deformities or irregularities can be a result of how the laminations are manufactured, e.g., warps or burrs can be caused by a lamination stamping process. Such gaps between the facing planar surfaces of the axially adjacent laminations are very narrow, typically a few micrometers, and are normally filled with a resin material during a VPI process as described above. It is the resin material in these narrow gaps that are prone to cracking as a result of deformations within the stator. Such gaps must be contrasted with the sealing recesses of embodiments of the present invention which are several orders of magnitude larger, and are deliberately provided in the stator to improve sealing within the coolant passageway. Each sealing recess is at least partially filled with resin material (and optionally, substantially entirely filled) such that the thickness of the resin material is enlarged locally at the surface of the coolant passageway where axially adjacent laminations abut each other. When cured, the resin material in each sealing recess provides a seal which is significantly wider than the narrow gap between the facing planar surfaces of axially adjacent laminations and hence more robust against relative movement. The resin material will normally also be applied to the surface of the coolant passageway to create a continuous, integral seal within the coolant passageway that includes the individual seals within the sealing recesses. In practice, it is likely that the individual seals will simply be defined by axially spaced areas of the continuous seal having an increased thickness where the resin material extends into the sealing recesses.

The axial width of each sealing recess will normally be selected to provide for optimal retention of the resin material during a VPI process. If the axial width of each sealing recess is too large, the resin material may flow out when drained. But on the other hand, if the axial width of each sealing recess is too small, the resin material that flows into and remains within the sealing recess may not be sufficient to provide the desired seal improvement. An important characteristic is the height of the resin material in the axial direction which must be sufficient to endure deformations within the stator without putting too much strain on the seal. The axial width of each sealing recess will also depend on the thickness of the actual laminations, and in particular on the thickness of the sheets of electrical grade steel from which they are typically formed.

As a non-limiting example, the axial width of each sealing recess may be in the range of about 0.01 mm to about 1 mm. The axial width of each sealing recess can be substantially constant or can vary along the outwardly extending direction, e.g., the sealing recesses can be tapered as described in more detail below. Where the axial width of each sealing recess varies along the outwardly extending direction, the range given above would relate to the axial width of each sealing recess at its widest point. The extent of each sealing recess in the outwardly extending direction from the surface of the coolant passage can be in the range of about 0.1 mm to about 10 mm.

The VPI process typically used to impregnate the assembled stator core can use different types of suitable resin material, e.g., resin materials with different viscosities. For example, a less viscous resin material can be used to infuse the stator insulation and fix the stator insulation in the stator slots, and a more viscous resin material can be used to seal the coolant passageway. The different types of resin material can be applied to the stator simultaneously or during separate stages of the VPI process, including after one of the resin materials has been cured.

The sealing recesses are, in an embodiment, annular sealing recesses that extend completely around the surface of the coolant passageway. An annular seal of cured resin material is then formed in each sealing recess as a result of the VPI process and subsequent curing. The term 'annular' is not intended to limit the present invention to a substantially circular cross section and it will be readily appreciated that the sealing recesses and the seals can have any suitable shape as required.

The shape of each sealing recess can correspond to the shape of the coolant passageway or it can be different. For example, the surface of the coolant passageway can have a complex shape that is designed to increase heat transfer by promoting turbulent flow of the coolant fluid through the coolant passageway, but the sealing recesses, and hence the axially spaced seals, can have a simpler shape that minimises strain on the seals.

The coolant passageway can have the same shape along its axial length or it can vary. All of the sealing recesses in the stator can have the same shape. Alternatively, at least some of the sealing recesses can have different shapes. For example, if the shape of the coolant passageway varies along its axial length, the shape of the sealing recesses can also vary.

Each sealing recess is defined by oppositely facing lamination surfaces and optionally by an end surface (together 'recess-defining surfaces'). The recess-defining surfaces can include one or more of a substantially planar surface, a profiled surface that can be substantially corrugated, crenellated, ridged, fluted, grooved or channeled etc., a substantially frusto-conical surface, a substantially angled surface (e.g., a surface that is not parallel with the planar surfaces of the laminations), a substantially cylindrical surface, or any combination thereof. Each sealing recess can be defined between oppositely facing lamination surfaces on a pair of laminations. But it must be emphasised that the pair of laminations are not necessarily axially adjacent to each other. In one arrangement, one or more laminations will be interposed between the pair of laminations defining a particular sealing recess and in this case one or more surfaces of such interposing laminations will also define the sealing recess.

If one of the oppositely facing lamination surfaces is substantially frusto-conical or angled, the sealing recess can be tapered along the direction extending outwardly from the coolant passageway. A tapered sealing recess can ensure that the conditions for the resin material to flow into and remain within the sealing recess when drained will be optimal for sealing at some point along its outwardly extending dimension. This can make the sealing recesses more tolerant of variations in parameters such as resin viscosity, surface tension, capillary attraction, actual geometry, stacking precision of the laminations etc. The tapered sealing recess can be widest at the coolant passageway surface and get narrower towards its outer extremity or vice versa.

The surface of the coolant passageway can have any suitable shape, e.g., a cross section that is circular, oval, rectangular, polygonal, star-shaped etc. with a surface that is substantially cylindrical (including elliptically cylindrical) or with one or more surfaces that are substantially planar, corrugated, crenellated, ridged, fluted, grooved or channeled etc., and which can define internal fins or protrusions. The coolant passageway can be designed to provide an increased surface area for improved heat transfer, for example. The coolant passageway can have a shape that is deliberately intended to promote turbulent flow of the coolant fluid through the coolant passageway. The shape of the coolant passageway can also depend on its location within the stator. For example, a coolant passageway located in the stator teeth might be constrained by the shape and configuration of the stator teeth, which is not necessarily the case for a coolant passageway located in the main body of the stator.

Each lamination includes an opening therein. When the laminations are stacked together to form the stator, the openings are axially aligned to define the coolant passageway. If the stator includes a plurality of coolant passageways, each lamination will include the same number of openings. The shape of the opening defines the shape of the relevant part of the coolant passageway or the sealing recess, i.e., the surface of the opening defines part of the surface of the coolant passageway or a surface of the sealing recess.

In one arrangement, a plurality of laminations have a recessed area in one of their planar surfaces. The recessed area can be formed by stamping, grinding or another suitable forming, machining or cutting process. The recessed area surrounds the opening and defines a sealing recess when each lamination is stacked against an axially adjacent lamination, i.e., so that the sealing recess is defined between a surface of the recessed area and the facing surface of the axially adjacent lamination. The recessed area can have any suitable shape. The recessed area can be defined, at least in part, by a substantially annular planar surface that is recessed relative to the planar surface of the remainder of the lamination, by a substantially frusto-conical or angled surface, or by a combination thereof. A substantially frusto-conical or angled surface will provide a sealing recess that is tapered. The plurality of laminations are normally stacked together in the same orientation, i.e., with the recessed areas facing towards one of the axial ends of the stator. In another arrangement, a plurality of laminations can have a recessed area in both of their planar surfaces. Each recessed area surrounds the opening. The recessed areas can be formed as described above, and can have any suitable shape. Laminations having a recessed area in both of their planar surfaces can be arranged alternately in the stator with laminations that have an opening but which do not have a recessed area. This can reduce costs because there is no need to provide recessed areas in at least some of the laminations. But the stator can also be formed by stacking just laminations having a recessed area in both of their planar surfaces, with each sealing recess being defined by two axially adjacent recessed areas. In any of these arrangements, the stacked laminations will define a plurality of axially spaced sealing recesses with each sealing recess being provided between an axially adjacent pair of laminations.

In another arrangement, the stator can include a plurality of first laminations having a first opening and a plurality of second laminations having a second opening. The first and second openings typically have the same cross section (i.e., they are both circular, oval, rectangular, polygonal, star-shaped etc.) and are positioned within their respective lamination so as to be coaxially aligned when the laminations are stacked, but the second opening is larger than the first opening. When the first and second laminations are arranged alternately in the stator, the first and second openings are axially aligned to define the coolant passageway and the axially spaced sealing recesses. More particularly, the first openings will define the surface of the coolant passageway and the second openings will define end surfaces of the sealing recesses. The profile of the end surfaces in the axial direction will depend on the profile of the second openings, e.g., a second opening defined by a substantially cylindrical surface or by substantially perpendicular planar surfaces (i.e., surfaces that are perpendicular to the planar surfaces of the laminations) will define a substantially cylindrical end surface or substantially perpendicular planar end surfaces, respectively, and a second opening defined by a substantially frusto-conical surface or substantially angled surfaces will define a frusto-conical end surface or angled end surfaces, respectively, and hence a tapered sealing recess. One or more second laminations can be interposed between each pair of first laminations. Each sealing recess will be provided between a pair of first laminations and will also be defined by the second openings of the one or more interposing second laminations.

The stator can include a plurality of axially extending coolant passageways around the circumference of the stator. Each coolant passageway can include a plurality of axially spaced sealing recesses that are at least partially filled with a cured resin material as described herein.

Each lamination can have the form of an annulus, or can itself be formed from a plurality of lamination segments, in an embodiment, abutting one another along generally radially extending edges.

Any suitable coolant fluid can be circulated through the coolant passageway(s), including air or other suitable gas, a gas/liquid mixture (e.g., a vapour), or a suitable liquid such as water, purified water, liquid dielectric or oil. The choice of coolant fluid will typically take into account concerns such as corrosion, electrical losses etc. If necessary, the external cooling circuit could include a treatment unit (e.g., for purifying or treating the coolant fluid) or a suitable additive could be added to the coolant fluid.

The stator can further include first and second compression plates (or end plates). A sealing recess can be provided between an end lamination and a corresponding compression plate.

Embodiments of the present invention further provides a method of manufacturing a stator for an electrical machine, the method comprising the steps of: stacking a plurality of axially adjacent generally annular laminations to form a stator core, the stator core including an axially extending coolant passageway through which a coolant fluid flows in use, and a plurality of axially spaced sealing recesses, wherein each sealing recess is in open communication with the surface of the axially extending coolant passageway, and has an axial width greater than the gap between the facing planar surfaces of axially adjacent laminations; subjecting the stator core to a VPI process such that the axially spaced sealing recesses are at least partially filled with resin material; and curing the resin material to define a plurality of axially spaced seals in the stator core.

BRIEF DESCRIPTION OF THE DRAWINGS

These and other features and aspects of the present disclosure will become better understood when the following detailed description is read with reference to the accompanying drawings in which like characters represent like parts throughout the drawings, wherein.

DETAILED DESCRIPTION

Figure 1:
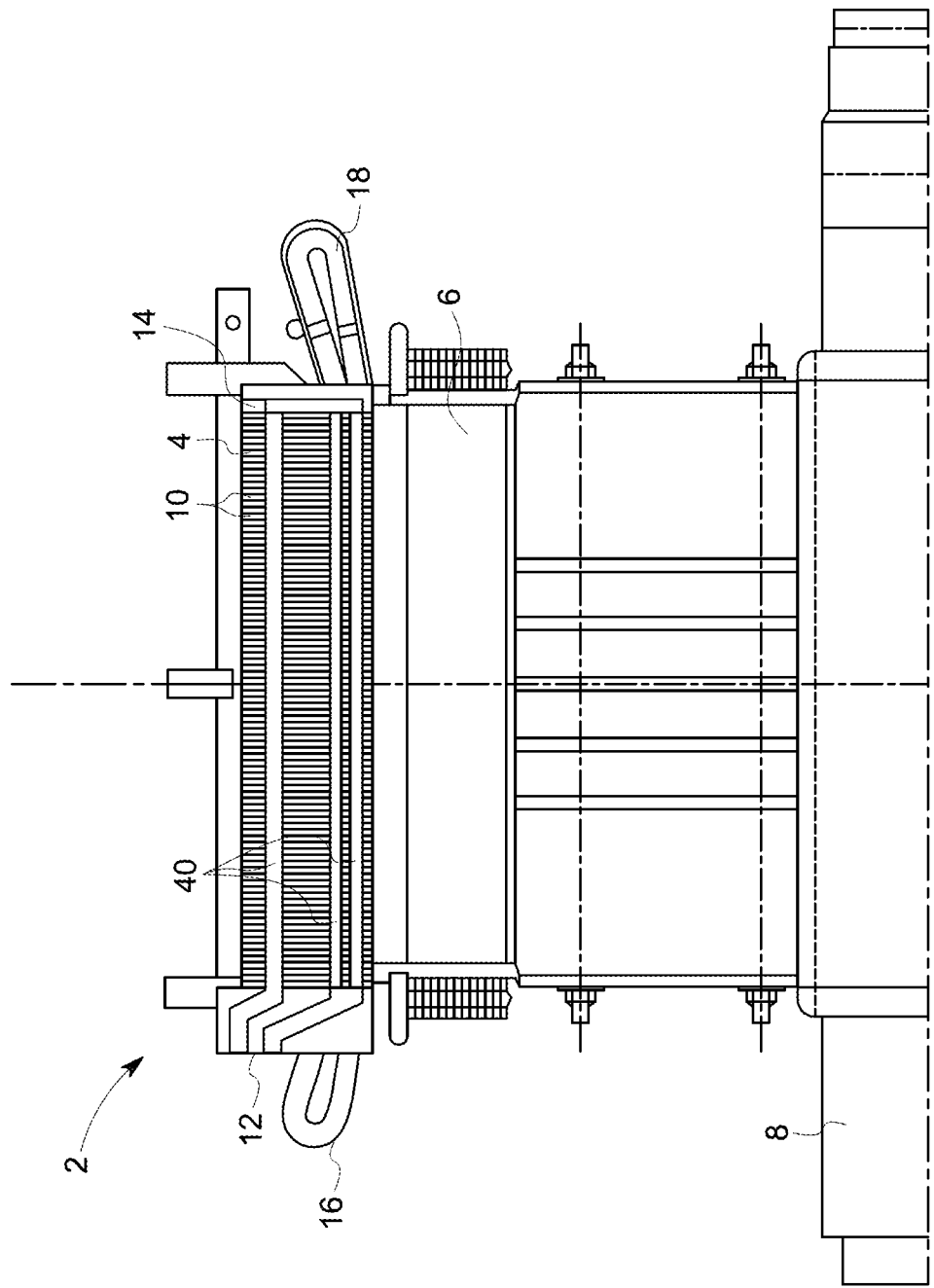
FIG. 1 is a side view and partial cross section of an electrical machine including a stator.
Figure 2:
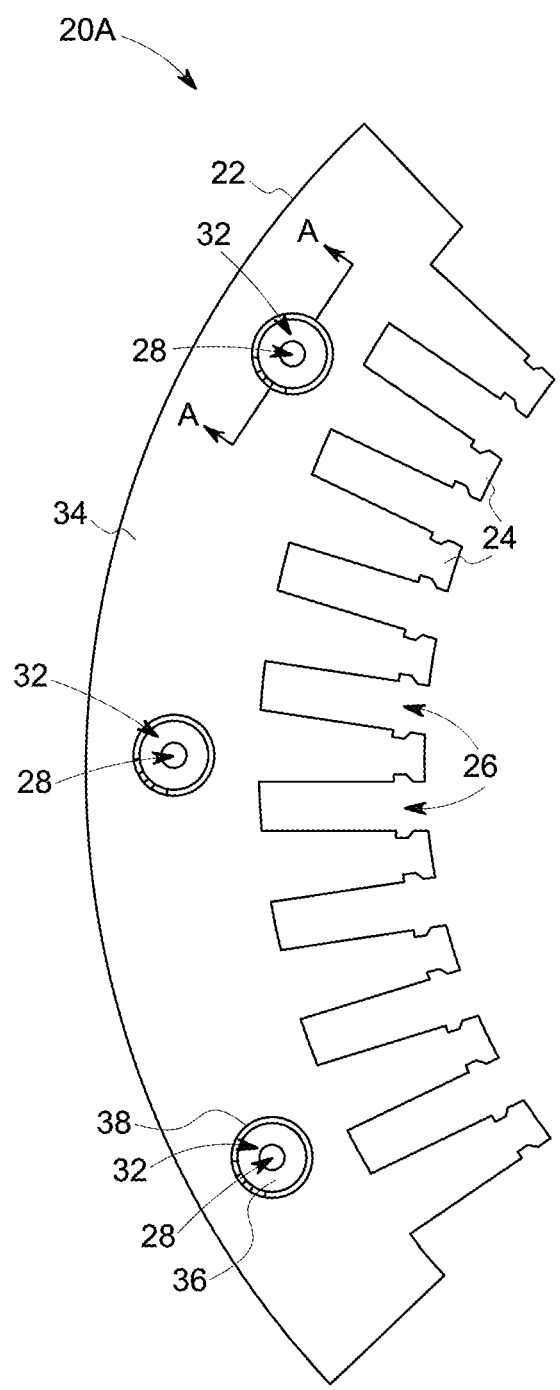
FIG. 2 is a top view of a lamination segment that can form part of the stator of FIG. 1.
Figure 3:
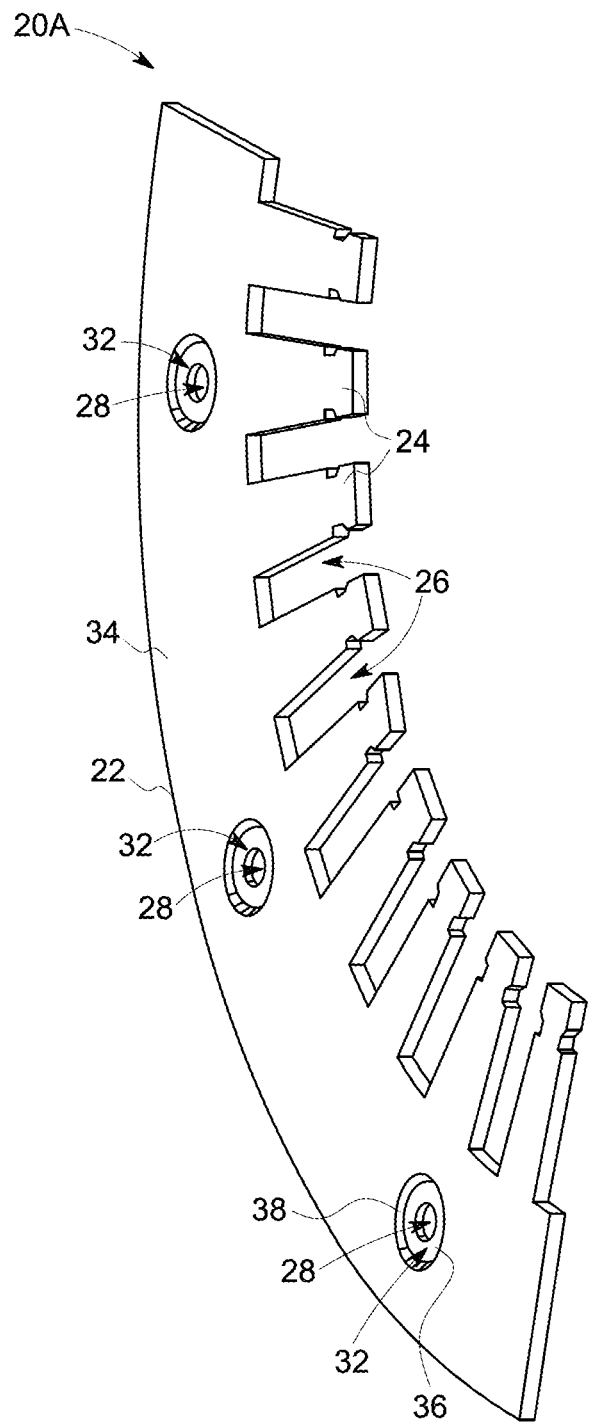
FIG. 3 is a perspective view of the lamination segment of FIG. 2.

FIG. 1 shows a cross section through an electrical machine 2 (e.g., a motor or generator) that includes a stator 4 and a rotor 6 separated by an air gap. The rotor 6 is mounted on a shaft 8. A plurality of annular lamination 10 are stacked together to form the stator core. The stator 4 includes a first end plate 12 and a second end plate 14. The stator 4 includes a plurality of stator winding conductors, the end-windings 16, 18 of which are shown in FIG. 1.

A plurality of axially extending coolant passageways 40 are provided in the stator core.

FIGS. 2 to 5 show a lamination segment 20A formed from a sheet of electrical grade steel. The lamination segment 20A has a radially outer edge 22 and a plurality of circumferentially spaced stator teeth 24 at a radially inner side. The stator teeth 24 define a plurality of circumferentially spaced stator slots 26 for receiving stator winding conductors 74 (see FIGS. 22 and 25). Four of the lamination segments 20A can be abutted along their radially extending edges to form an annular lamination 10. A plurality of annular laminations 10 can then be axially stacked together to form an assembled stator core that is compressed, optionally heat treated, impregnated with a resin material using a VPI process and subsequently cured.

Figure 4:
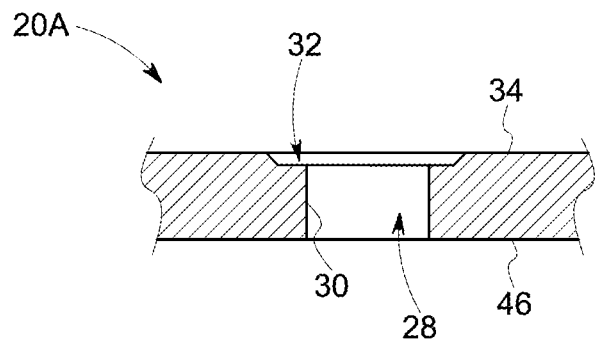
FIG. 4 is a cross section view of the lamination segment of FIG. 2 taken along line A-A.
Figure 5:
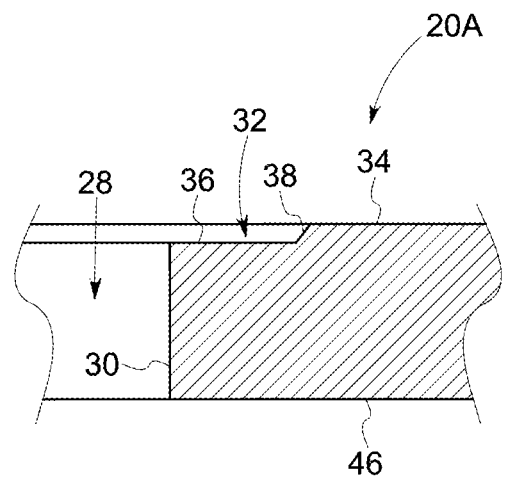
FIG. 5 is a detail cross section view of the lamination segment of FIG. 2.

The lamination segment 20A includes three identical openings 28 in the radially outer part that defines the main body of the stator core. Each opening 28 is circular and is defined by a cylindrical surface 30 (FIGS. 4 and 5). The radius of each opening 28 is between about 2 mm and about 200 mm. It will be readily appreciated that in practice the lamination segment can have any suitable number of openings, and that the openings can have any suitable shape.

Each opening 28 is surrounded by a shallow annular recessed area 32. The recessed areas 32 are formed in a first planar surface 34 of the lamination segment 20A. As shown most clearly in FIG. 5, each recessed area 32 is defined by an annular planar surface 36 that is recessed relative to the first planar surface 34 of the lamination segment 20A and a frusto-conical surface 38 that extends between the radially outer periphery of the annular planar surface 36 and the first planar surface 34 of the lamination segment 20A. The axial width (or depth) of each recessed area 32 is between about 0.01 mm and about 1.0 mm. The radial extent of each recessed area 32 is between about 0.1 mm and about 10 mm. In other words, each recessed area 32 is concentric with the respective opening 28 and can have a radius that is between about 0.1 mm and about 10 mm larger than the radius of the opening. It will therefore be readily appreciated that the recessed areas 32 are shown exaggerated in the drawings for clarity.

Figure 6:
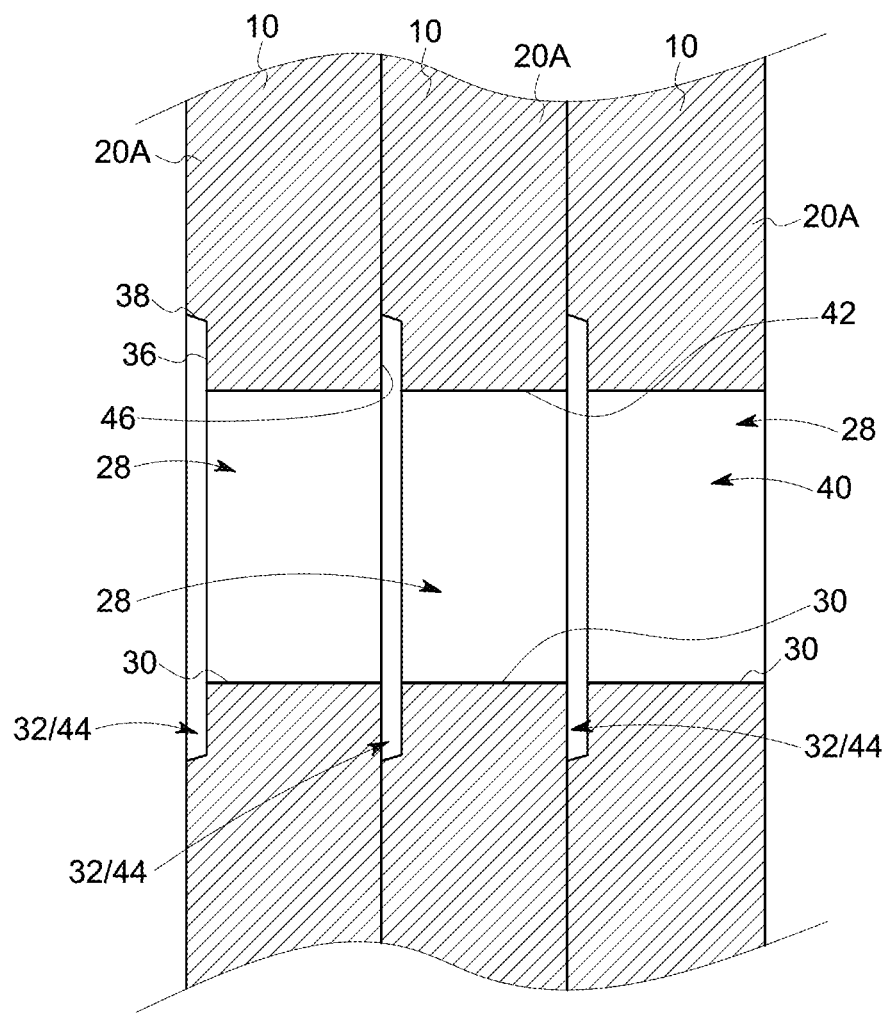
FIG. 6 is a cross section view of a plurality of stacked lamination segments of FIG. 2 before VPI and curing processes.

FIG. 6 shows annular laminations 10 stacked together before the stator core undergoes the VPI and curing processes. Each annular lamination 10 includes four lamination segments 20A but only part of one is shown. The openings 28 in the annular laminations 10 are axially aligned to form axially extending coolant passageways 40 in the assembled stator core. The coolant passageways 40 extend between the end plates 12, 14 to extract heat from the stator 4 during operation of the electrical machine 2. Only part of one of the coolant passageways 40 is shown in FIG. 6.

The cylindrical surface 42 of each coolant passageway 40 is defined by the axially aligned cylindrical surfaces 30 of each opening 28.

The annular laminations 10 are stacked with their recessed areas 32 facing in the same direction as shown. The recessed areas 32 therefore define a plurality of axially spaced annular sealing recesses 44 between each axially adjacent pair of laminations 10. Each sealing recess 44 is in communication with the coolant passageway 40 and is defined by the annular planar surface 36 and the frusto-conical surface 38 of one of the annular laminations 10, and by an annular facing part of the second planar surface 46 of the axially adjacent annular lamination.

Figure 7:
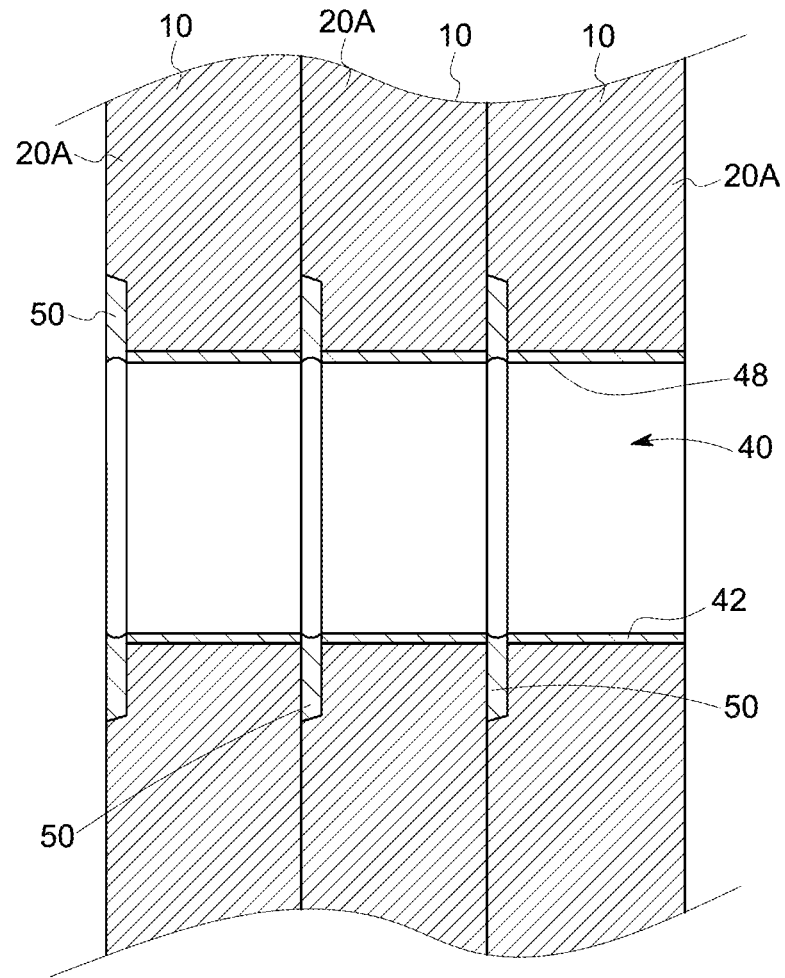
FIG. 7 is a cross section view of the plurality of stacked lamination segments of FIG. 2 after VPI and curing processes.
Figure 8:
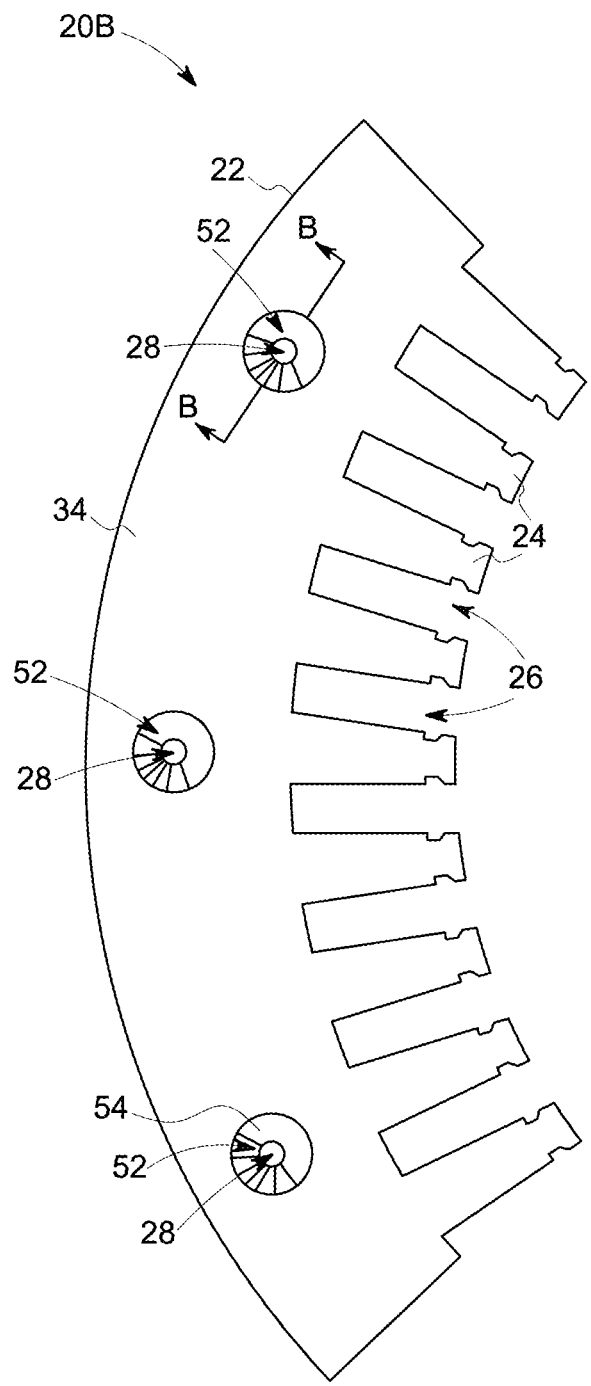
FIG. 8 is a top view of an alternative lamination segment that can form part of the stator of FIG. 1.
Figure 9:
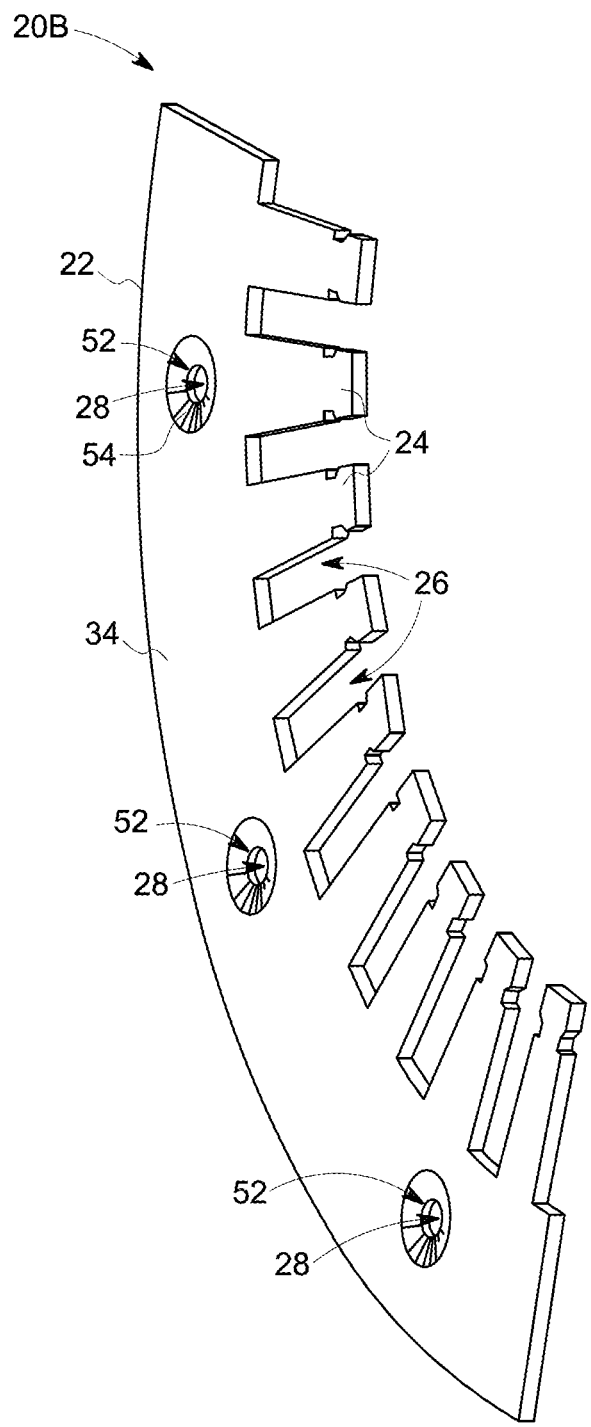
FIG. 9 is a perspective view of the lamination segment of FIG. 8.
Figure 10:
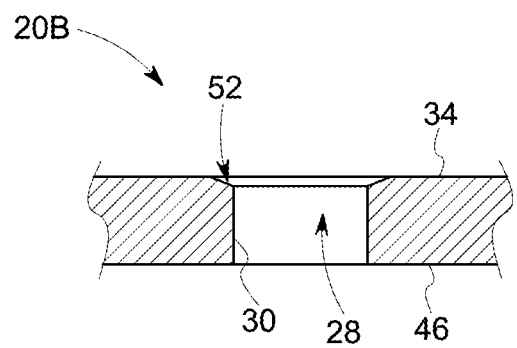
FIG. 10 is a cross section view of the lamination segment of FIG. 8 taken along line B-B.
Figure 11:
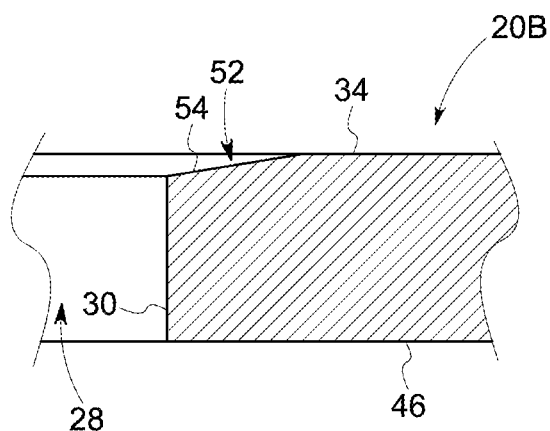
FIG. 11 is a detail cross section view of the lamination segment of FIG. 8.
Figure 12:
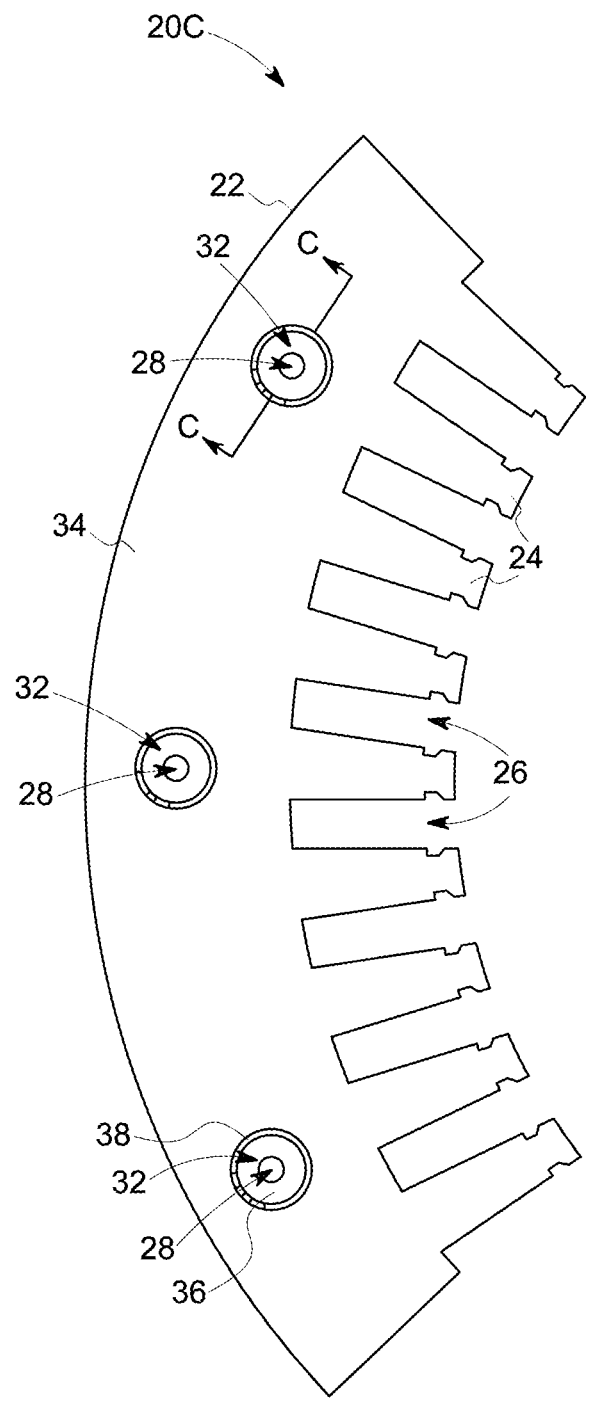
FIG. 12 is a top view of an alternative lamination segment that can form part of the stator of FIG. 1.
Figure 13:
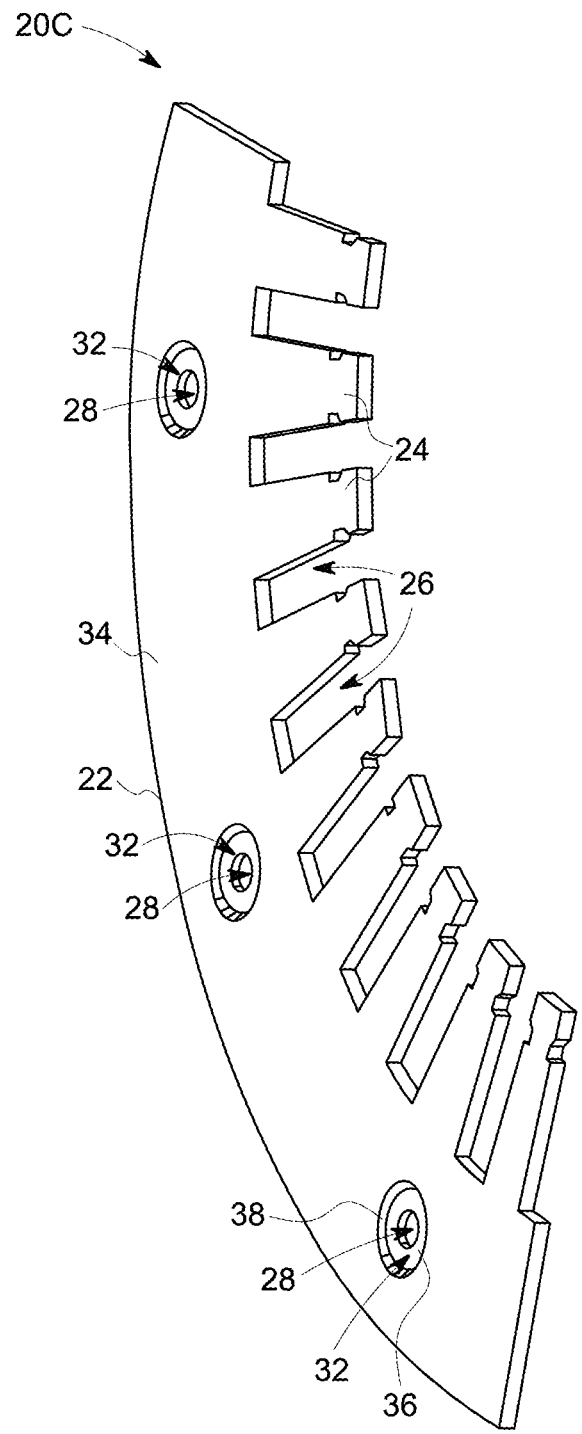
FIG. 13 is a top perspective view of the lamination segment of FIG. 12.
Figure 14:
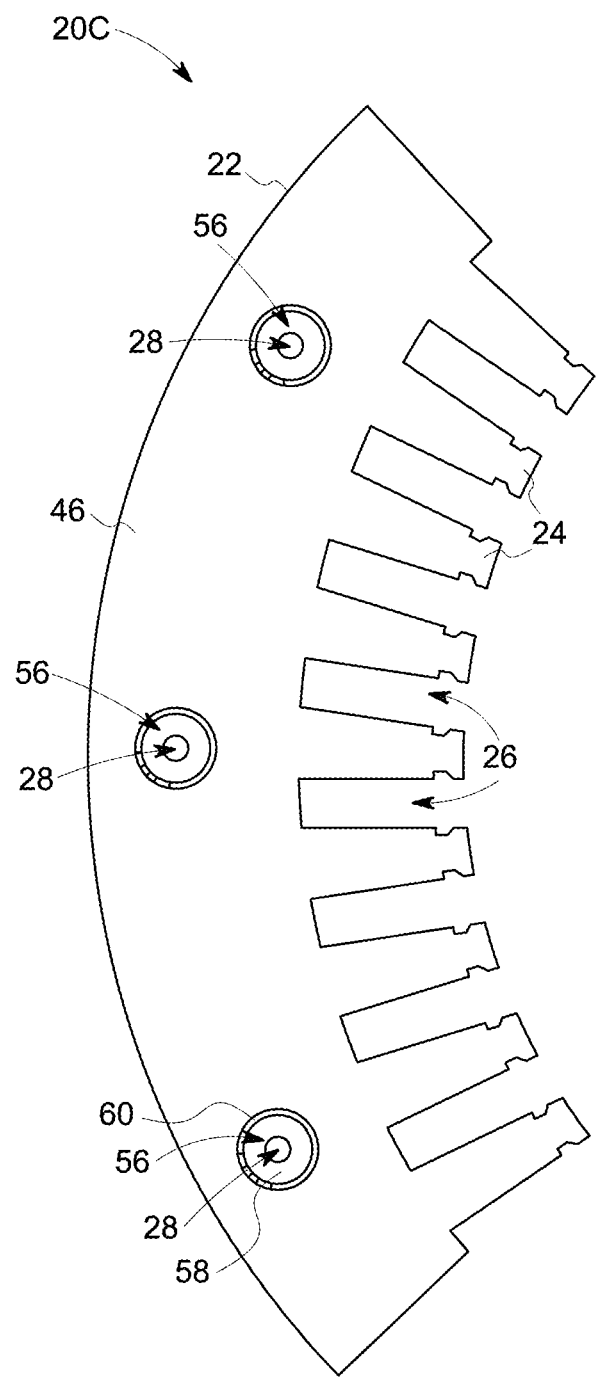
FIG. 14 is a bottom view of the lamination segment of FIG. 12.
Figure 15:
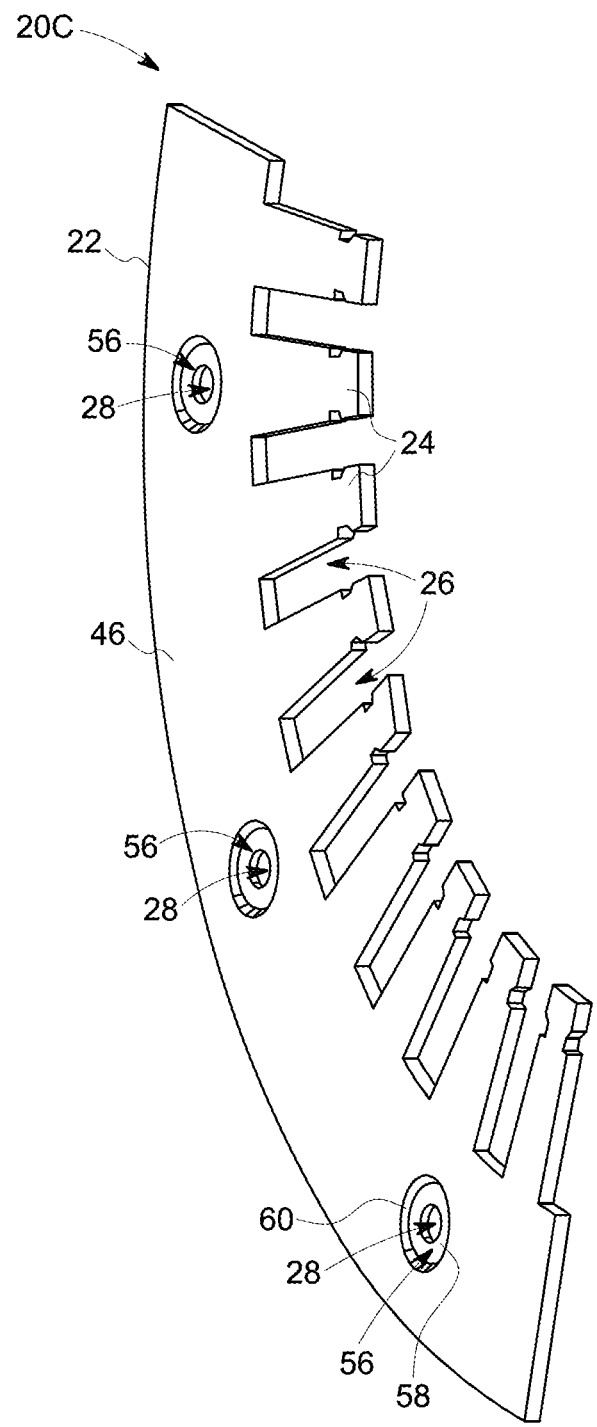
FIG. 15 is a bottom perspective view of the lamination segment of FIG. 12.
Figure 16:
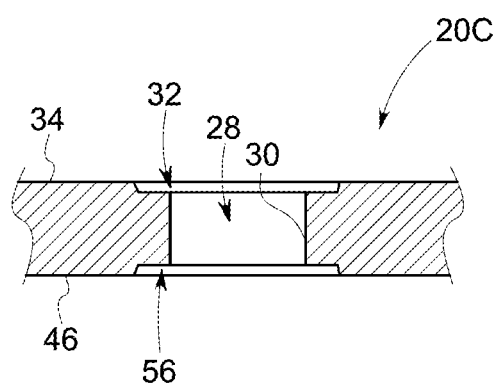
FIG. 16 is a cross section view of the lamination segment of FIG. 12 taken along line C-C.
Figure 17:
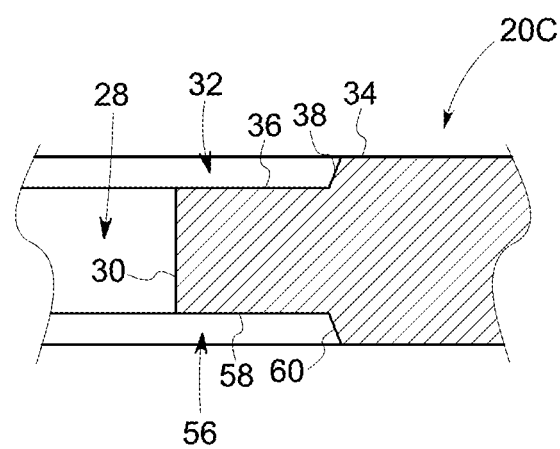
FIG. 17 is a detail cross section view of the lamination segment of FIG. 12.

With reference to FIG. 7, after the VPI and curing processes, the cylindrical surface 42 of the coolant passageway 40 is coated with a continuous layer 48 of cured resin material. The layer 48 of cured resin material extends into the sealing recesses 44 to define axially spaced annular seals 50. Put another way, the layer 48 of cured resin material defines a continuous, integral seal within the coolant passageway 40 where the annular seals 50 are axially spaced areas of the layer 48 of increased thickness where the resin material extends into the sealing recesses 44. Although not shown, the resin material impregnated during the VPI process will also extend into the narrow gaps or voids between the facing planar surfaces 34, 46 of axially adjacent annular laminations 10 that are caused by localised deformities or irregularities in the individual laminations. Such a seal can better prevent leakage of coolant fluid into the stator core because it is more robust against relative movement or deformation of the stator core caused by temperature changes, mechanical loading and vibration etc.

FIGS. 8 to 11 show a different lamination segment 20B that is similar to lamination segment 20A described above and the same reference numbers have been used where appropriate. Four of the lamination segments 20B can be abutted along their radially extending edges to form an annular lamination.

Each opening 28 is surrounded by a shallow annular recessed area 52 formed in the first planar surface 34 of the lamination segment 20B. As shown most clearly in FIG. 11, each recessed area 52 is defined by a frusto-conical surface 54 that extends between the cylindrical surface 30 of the opening 28 and the first planar surface 34. The axial width (or depth) of each recessed area 52 at its widest point (i.e., at the opening 28) is between about 0.01 mm and about 1.0 mm. The radial extent of each recessed area 52 is between about 0.1 mm and about 10 mm. In other words, each recessed area 52 is concentric with the respective opening 28 and can have a radius that is between about 0.1 mm and about 10 mm larger than the radius of the opening 28. It will therefore be readily appreciated that the recessed areas 52 are shown exaggerated in the drawings for clarity.

Although not shown, it will be readily appreciated that annular laminations formed from the lamination segments 20B can be stacked with their recessed areas 52 facing in the same direction. The recessed areas 52 therefore define a plurality of axially spaced annular sealing recesses between each axially adjacent pair of annular laminations 10. Each sealing recess is in communication with the coolant passageway and is defined by the frusto-conical surface 52 of one of the annular laminations 10, and by an annular facing part of the second planar surface of the axially adjacent annular lamination. The sealing recesses will therefore have a different shape to those shown in FIG. 6. In particular, the sealing recesses are tapered in the outwardly extending dimension. This means that the conditions for the resin material to flow into and remain within the sealing recess when drained will be optimal for sealing at some point along its outwardly extending dimension. The axially spaced annular seals formed by the layer of cured resin material that extends into the sealing recesses after the VPI and curing processes will also have a different shape to those shown in FIG. 7.

FIGS. 12 to 19 show a different lamination segment 20C that is similar to lamination segment 20A described above and the same reference numbers have been used where appropriate. Four of the lamination segments 20C can be abutted along their radially extending edges to form an annular lamination 10.

Each opening 28 is surrounded by a first shallow annular recessed area 32 and a second annular shallow recessed area 56. The first recessed areas 32 are formed in the first planar surface 34 of the lamination segment 20C and the second recessed areas 56 are formed in the second planar surface 46 of the lamination segment. As shown most clearly in FIG. 17, each first recessed area 32 is defined by an annular planar surface 36 that is recessed relative to the first planar surface 34 of the lamination segment 20B and a frusto-conical surface 38 that extends between the radially outer periphery of the annular planar surface 36 and the first planar surface 34 of the lamination segment 20B. The first recessed areas 32 have the dimensions outlined above. Each second recessed area 56 is defined by an annular planar surface 58 that is recessed relative to the second planar surface 46 of the lamination segment 20C and a frusto-conical surface 60 that extends between the radially outer periphery of the annular planar surface 58 and the second planar surface 46 of the lamination segment 20C. The axial width (or depth) of each second recessed area 56 is between about 0.01 mm and about 1.0 mm. The radial extent of each second recessed area 56 is between about 0.01 mm and about 10 mm. In other words, each second recessed area 56 is concentric with the respective opening 28 (and the first recessed area 32) and can have a radius that is between about 0.1 mm and about 10 mm larger than the radius of the opening. It will therefore be readily appreciated that the recessed areas 32, 56 are shown exaggerated in the drawings for clarity.

Figure 18:
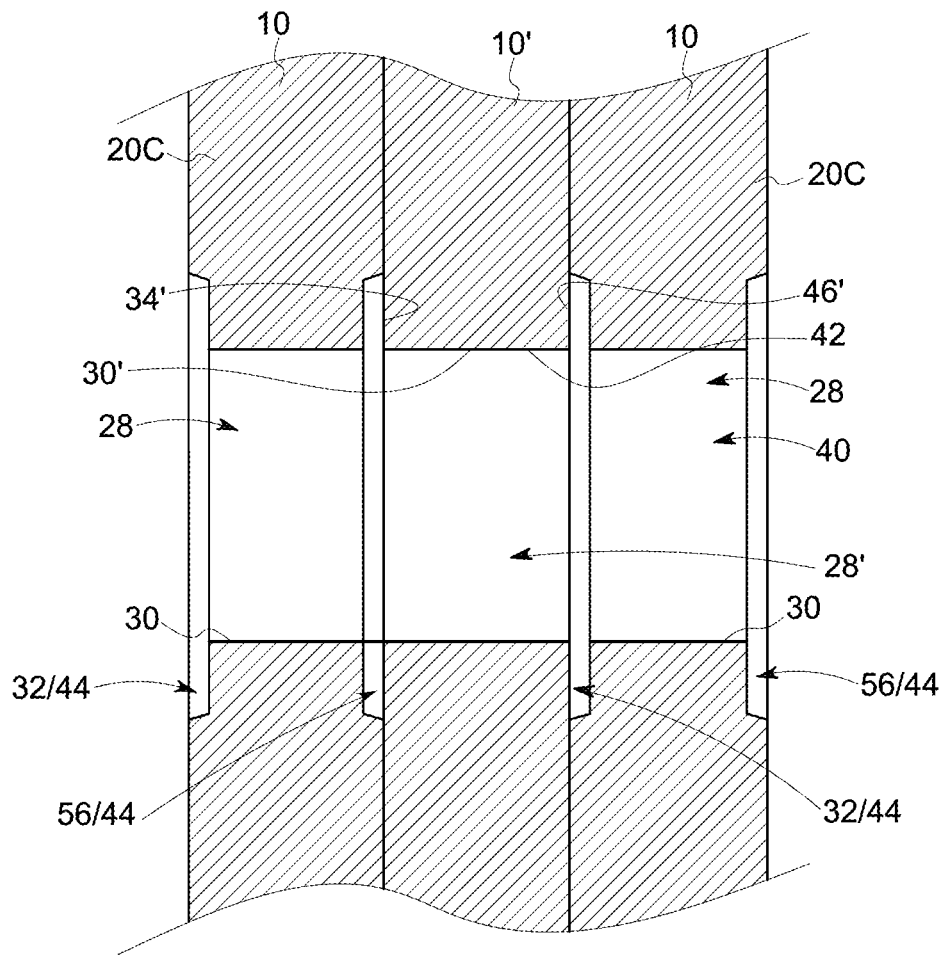
FIG. 18 is a cross section view of a plurality of stacked lamination segments of FIG. 12 before VPI and curing processes.

FIG. 18 shows annular laminations 10 stacked together before the stator core undergoes the VPI and curing processes. Each annular lamination 10 includes four lamination segments 20C but only part of one is shown.

An annular lamination 10' is interposed between each pair of annular laminations 10. The annular laminations 10' include openings 28' but no recessed areas. Each opening 28' is circular and is defined by a cylindrical surface 30'. The openings 28, 28' in the lamination 10, 10' are axially aligned to form axially extending coolant passageways 40 in the assembled stator core. Only part of one of the coolant passageways 40 is shown in FIG. 18.

The cylindrical surface 42 of each coolant passageway 40 is defined by the aligned cylindrical surfaces 30, 30' of each opening 28.

The first and second recessed areas 32, 56 define a plurality of axially spaced annular sealing recesses 44 between each adjacent pair of laminations 10, 10'. Each sealing recess 44 is in communication with the coolant passageway 40. Some sealing recesses 44 are defined by the annular planar surface 36 and the frusto-conical surface 38 of one of the annular laminations 10 and by an annular facing part of the second planar surface 46' of the axially adjacent annular lamination 10'. The other sealing recesses 44 are defined by the annular planar surface 58 and the frusto-conical surface 60 of one of the annular laminations and by an annular facing part of the first planar surface 34' of the axially adjacent annular lamination 10'. Although not shown, the annular laminations 10 can also be stacked together without the annular laminations 10' such that each sealing recess is defined by two axially adjacent recessed areas, i.e., the first recessed area 32 of one of the annular laminations 10 and by the second recessed area 56 of the axially adjacent annular lamination 10. In this case each sealing recess would have an axial width twice that of the sealing recesses 44 shown in FIG. 18.

Figure 19:
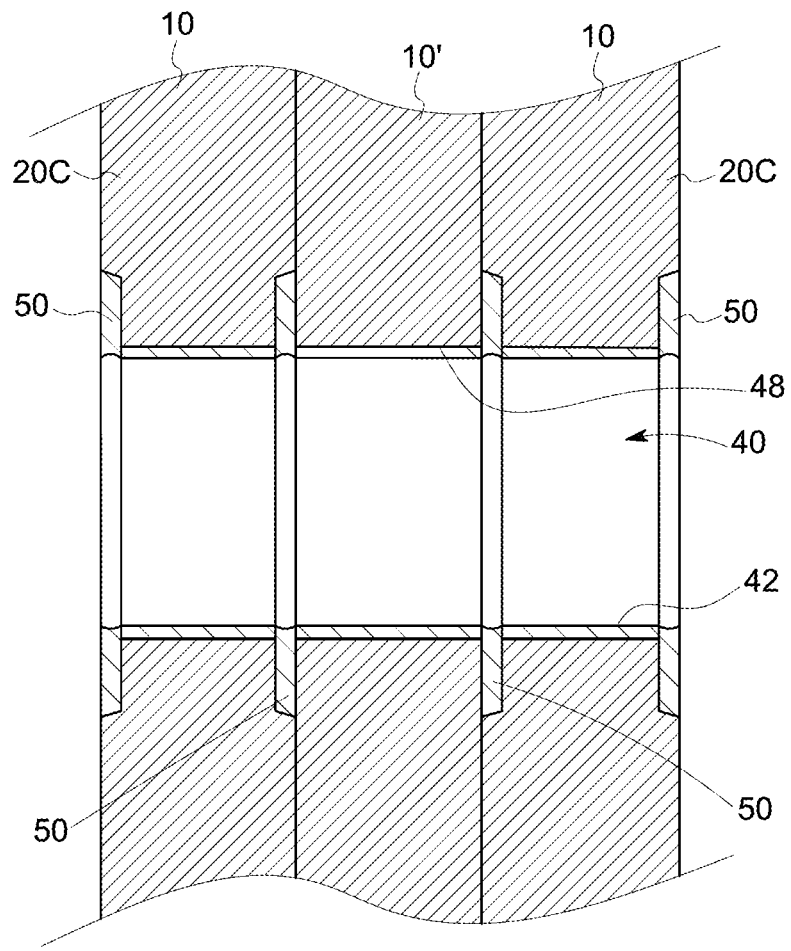
FIG. 19 is a cross section view of the plurality of stacked lamination segments of FIG. 12 after VPI and curing processes.

With reference to FIG. 19, after the VPI and curing processes, the cylindrical surface 42 of the coolant passageway 40 is coated with a continuous layer 48 of cured resin material. The layer 48 of cured resin material extends into the sealing recesses 44 to define axially spaced annular seals 50. Although not shown, the resin material impregnated during the VPI process will also extend into the narrow gaps or voids between the facing planar surfaces 34, 46' and 34', 46 of axially adjacent annular laminations 10, 10' that are caused by localised deformities or irregularities in the individual laminations.

Although the openings 28 described above are located in the part of the lamination segments that define the main body of the stator core, it will be readily appreciated that the openings can also be provided at different locations within the lamination segments. By way of example, FIGS. 20 to 25 show lamination segments 20D, 20E with differently shaped openings formed in the stator teeth. The lamination segments 20D, 20E are similar to the lamination segments described above and the same reference numbers have been used where appropriate. Four of the lamination segments 20D, 20E can be abutted along their radially extending edges to form an annular lamination.

Figure 20:
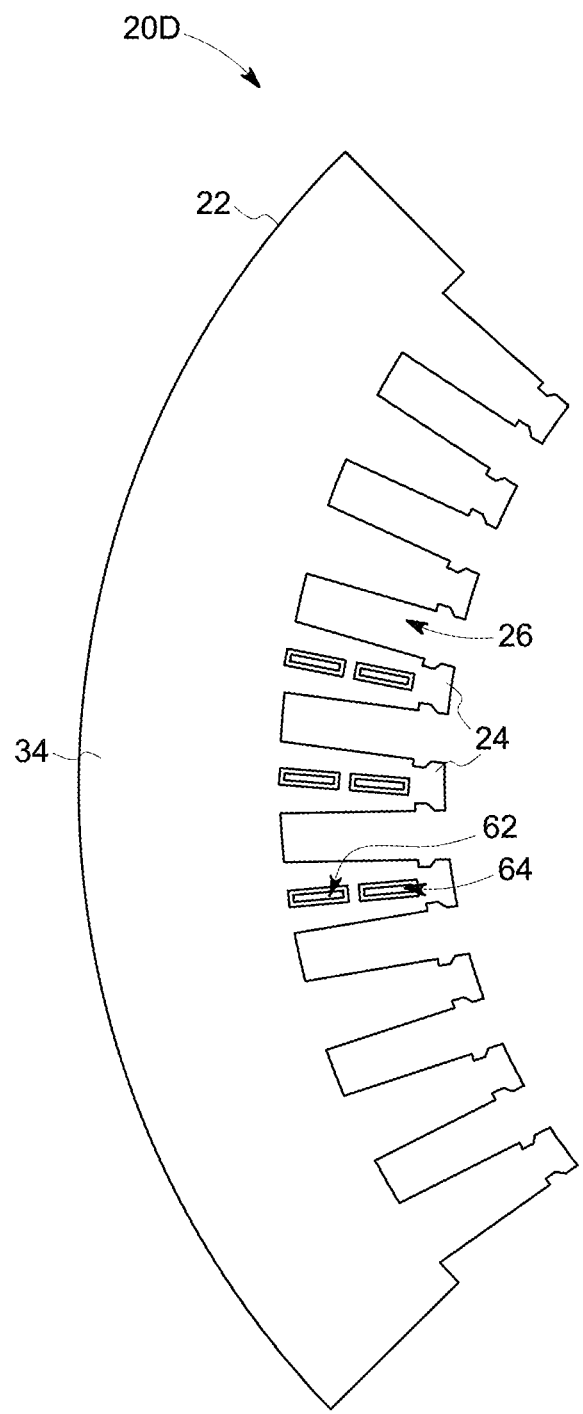
FIG. 20 is a top view of an alternative lamination segment that can form part of the stator of FIG. 1.
Figure 21:
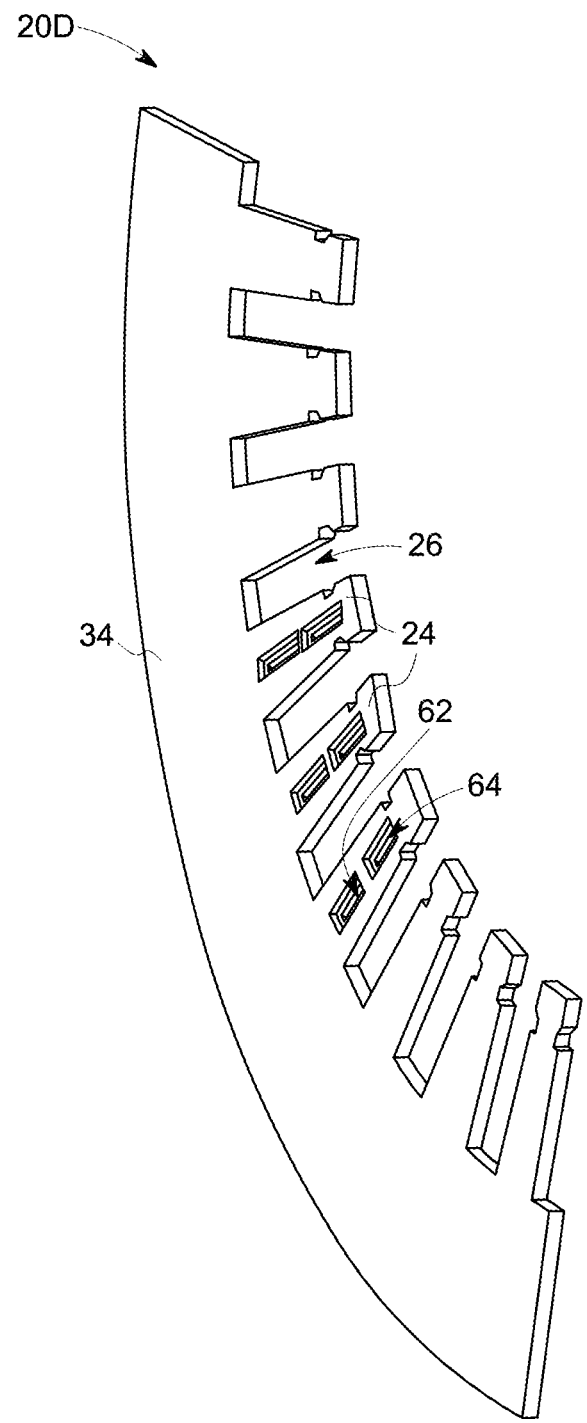
FIG. 21 is a perspective view of the lamination segment of FIG. 20.
Figure 22:
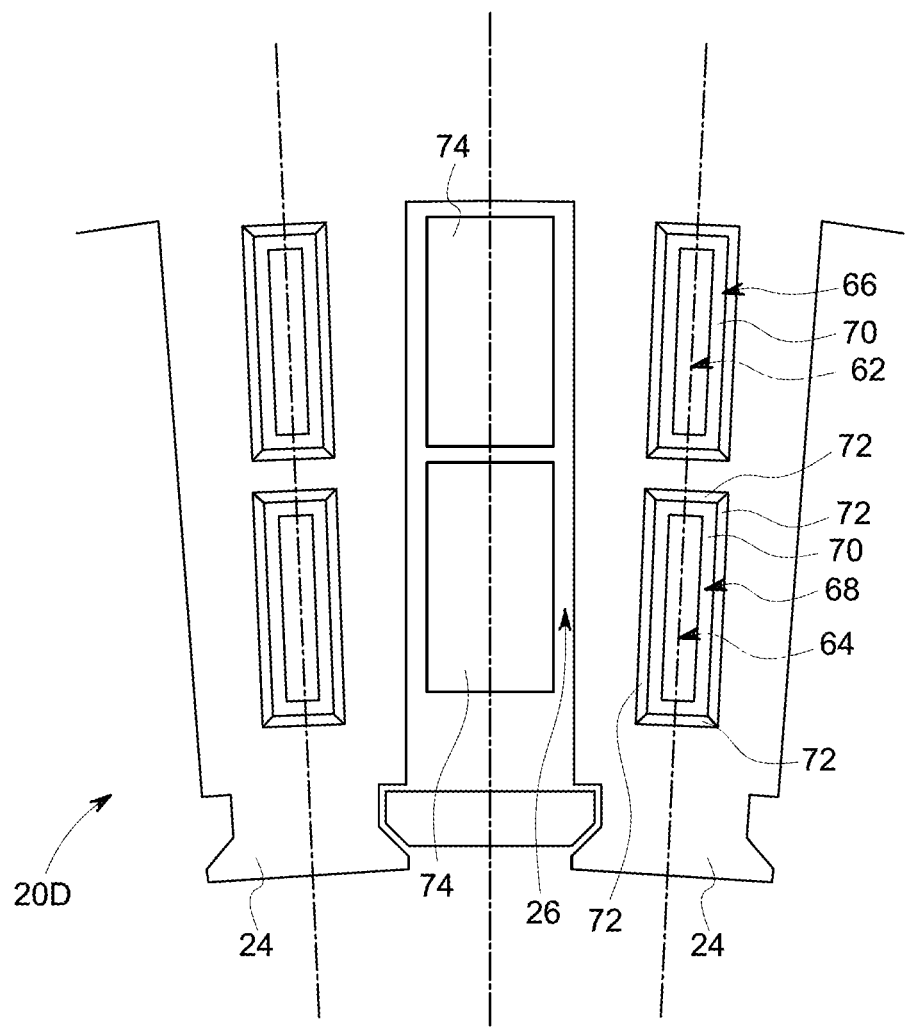
FIG. 22 is a detail top view of the lamination segment of FIG. 20 with stator winding conductors inserted into the stator slots.

With reference to FIGS. 20 to 22, the lamination segment 20D includes two openings 62, 64 in each stator tooth 24. Openings are shown in only three of the stator teeth for clarity. Each opening 62, 64 is rectangular and is defined by four perpendicular planar surfaces, i.e., surfaces that are perpendicular to the planar surfaces of the laminations. The openings 62, 64 define two axially extending coolant passageways in each stator tooth 24 when the laminations are stacked together. Each opening 62, 64 is surrounded by a respective recessed area 66, 68. The recessed areas 66, 68 are formed in the first planar surface 34 of the lamination segment 20D. Each recessed area 66, 68 is defined by an annular planar surface 70 that extends around the opening that is recessed relative to the planar surface 34 of the lamination segment 20D and by four angled planar surfaces 72.

The annular laminations are stacked with their recessed areas 66, 68 facing in the same direction. The recessed areas 66, 68 therefore define a plurality of axially spaced annular sealing recesses between each axially adjacent pair of laminations. Each sealing recess is in communication with the respective coolant passageway in the stator tooth 24 and is defined by the annular planar surfaces 70 and the four angled planar surfaces 72 of one of the annular laminations, and by an annular facing part of the second planar surface of the axially adjacent annular lamination.

FIG. 22 shows two of the stator teeth 24 in more detail, together with the stator winding conductors 74 that are located in each stator slot 26.

Figure 23:
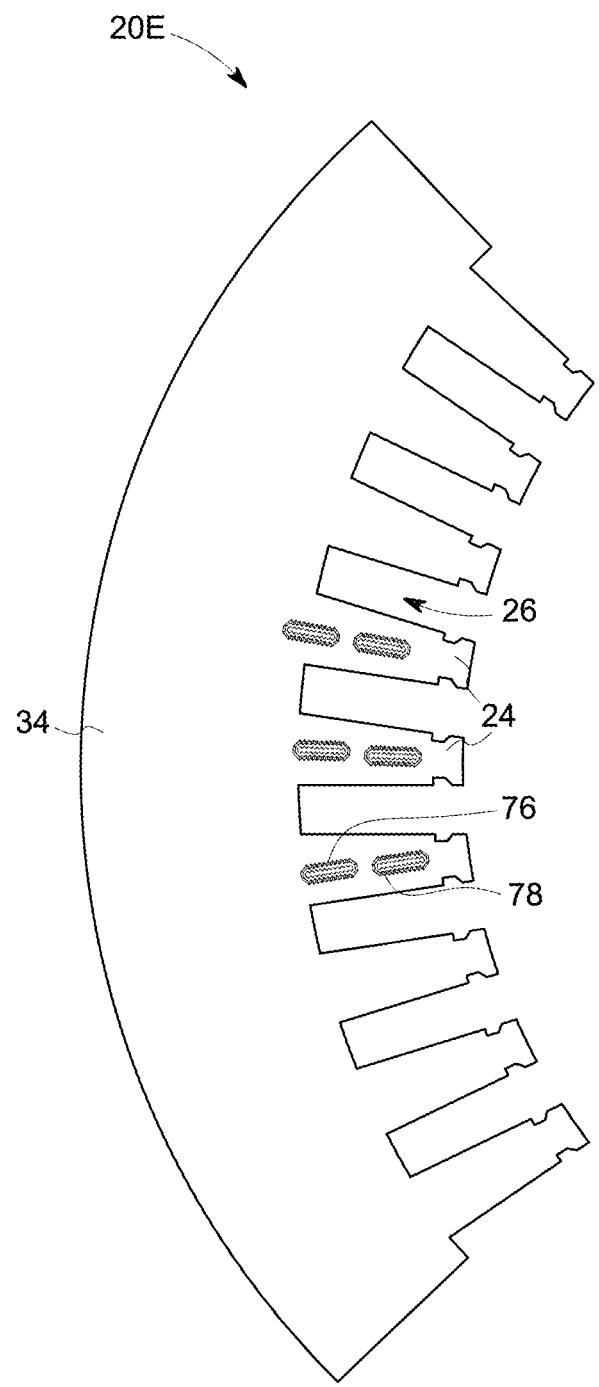
FIG. 23 is a top view of an alternative lamination segment that can form part of the stator of FIG. 1.
Figure 24:
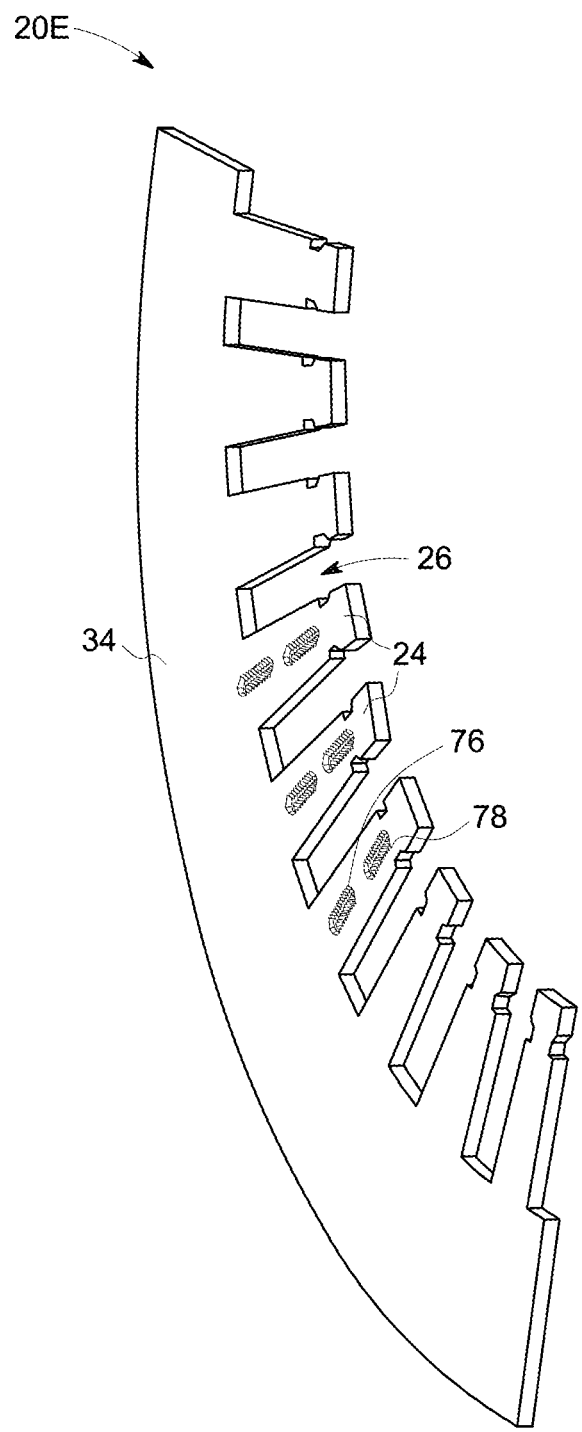
FIG. 24 is a perspective view of the lamination segment of FIG. 23.
Figure 25:
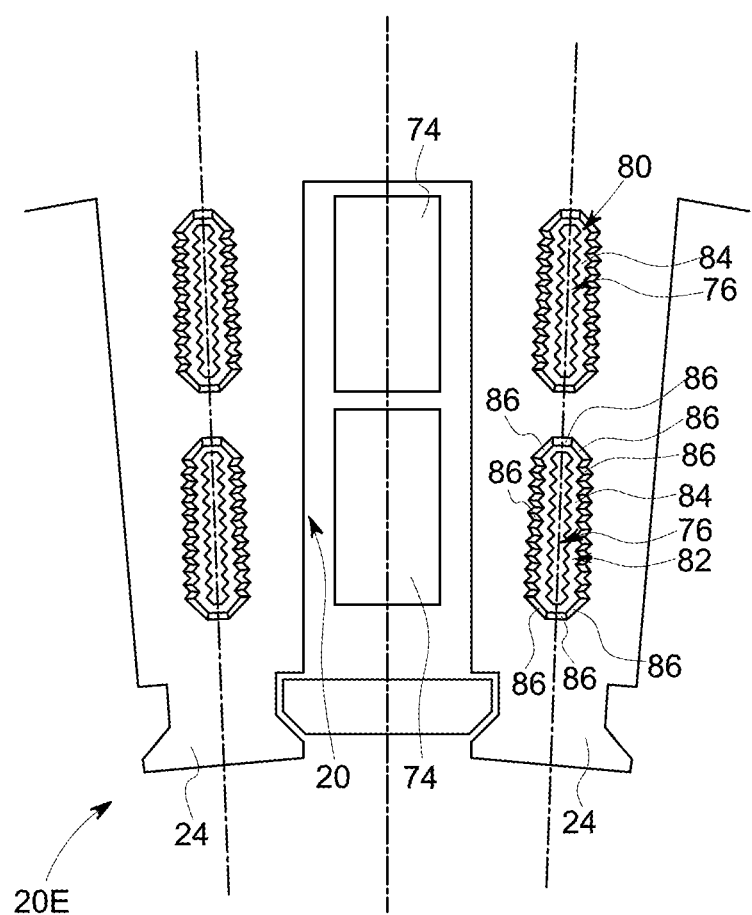
FIG. 25 is a detail top view of the laminations segment of FIG. 23 with stator winding conductors inserted into the stator slots.

With reference to FIGS. 23 to 25, the lamination segment 20E includes two openings 76, 78 in each stator tooth 24. Openings are shown in only three of the stator teeth for clarity. The openings 76, 78 in one of the stator teeth are shown at a slightly different location, i.e., displaced further from the end of the respective stator tooth to illustrate the fact that the openings, and hence the coolant passageways, do not need to identically located in each stator tooth. Each opening 76, 78 is substantially rectangular and is defined by a two planar surfaces and two corrugated surfaces. The openings 76, 78 define two axially extending coolant passageways in each stator tooth 24 when the laminations are stacked together. Each opening 76, 78 is surrounded by a respective recessed area 80, 82. The recessed areas 80, 82 are formed in the first planar surface 34 of the lamination segment 20E. Each recessed area 80, 82 is defined by an annular planar surface 84 that extends around the opening that is recessed relative to the planar surface 34 of the lamination segment 20E and by a combination of angled planar and corrugated surfaces 86.

The annular laminations are stacked with their recessed areas 80, 82 facing in the same direction. The recessed areas 80, 82 therefore define a plurality of axially spaced annular sealing recesses between each axially adjacent pair of laminations. Each sealing recess is in communication with the respective coolant passageway in the stator tooth 24 and is defined by the annular planar surfaces 84 and the combination of angled planar and corrugated surfaces 86 of one of the annular laminations, and by an annular facing part of the second planar surface of the axially adjacent annular lamination.

FIG. 25 shows two of the stator teeth 24 in more detail, together with the stator winding conductors 74 that are located in each stator slot 26.

Although the recessed areas 80, 82 in the lamination segment 20E have the same general shape as the openings 76, 78, it will be readily appreciated that the recessed areas can have a different shape, e.g., they might be rectangular like the recessed areas 66, 68 and defined by four angled planar surfaces instead of the combination of angled planar and corrugated surfaces. Because it is the shape of each recessed area that determines the shape of the annular seal, this would result in the annular seals having a simpler shape.

The lamination segments described with reference to FIGS. 2 to 25 are broadly similar in that they rely on a recessed area in at least one of the first and second planar surfaces of the annular lamination to define the sealing recesses when the annular laminations are stacked together.

Figure 26:
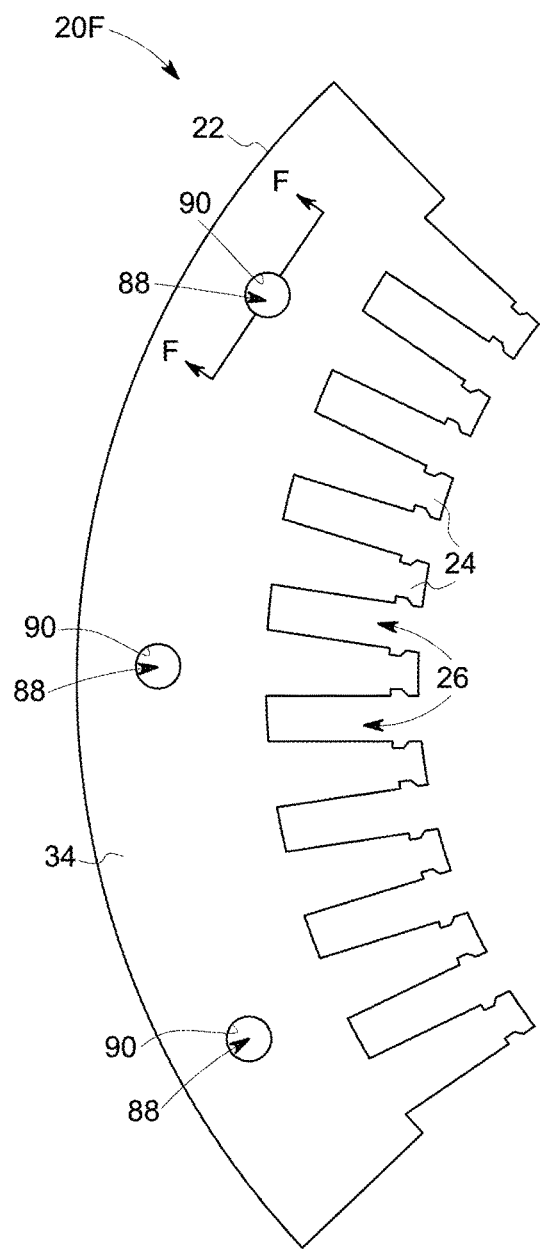
FIG. 26 is a top view of an alternative first lamination segment that can form part of the stator of FIG. 1.
Figure 27:
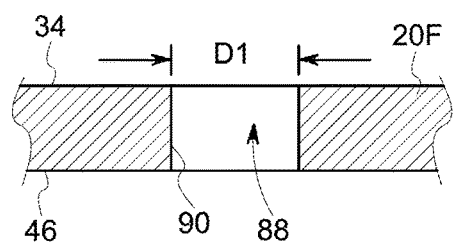
FIG. 27 is a cross section view of the first lamination segment of FIG. 26 along line F-F.
Figure 28:
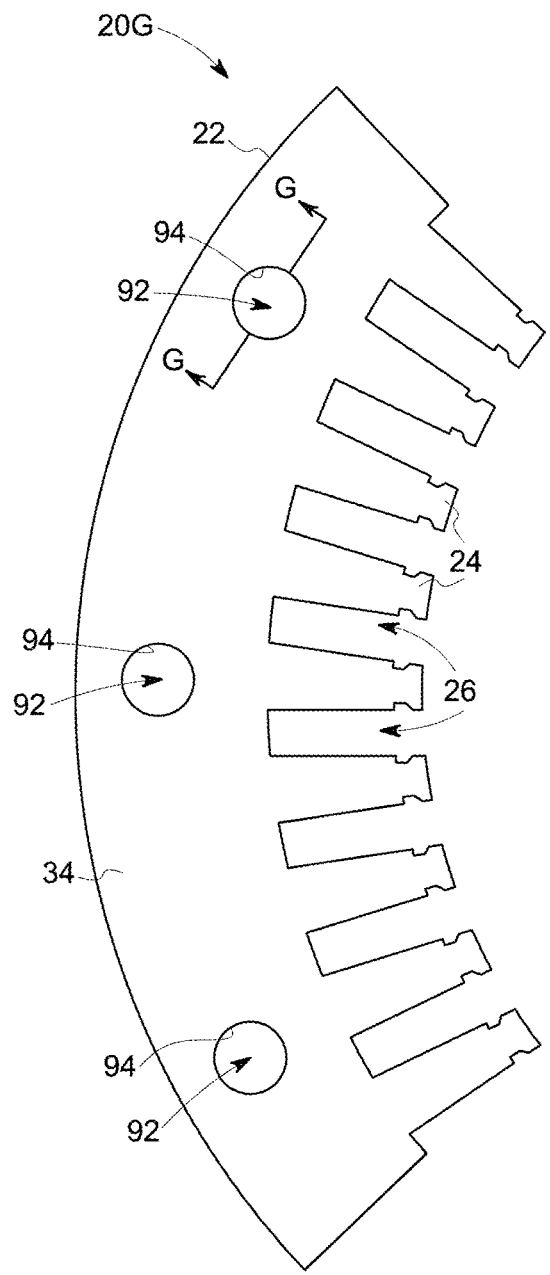
FIG. 28 is a top view of an alternative second lamination segment that can form part of the stator of FIG. 1.
Figure 29:
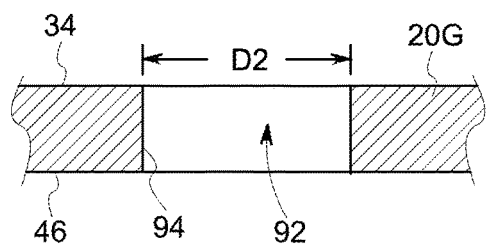
FIG. 29 is a cross section view of the second lamination segment of FIG. 28 along line G-G.

A different arrangement that uses at least two different annular laminations with differently sized openings is now described with reference to FIGS. 26 to 31. In particular, a first lamination segment 20F is shown in FIGS. 26 and 27 and a second lamination segment 20G is shown in FIGS. 28 and 29. The first and second lamination segments 20F, 20G are similar to the lamination segments described above and the same reference numbers have been used where appropriate.

The first lamination segment 20F includes three identical openings 88 in the radially outer part that defines the main body of the stator core. Each opening 88 is circular and is defined by a cylindrical surface 90. Each opening 88 has a first diameter D1.

The second lamination segment 20G includes three identical openings 92 in the radially outer part that defines the main body of the stator core. Each opening 92 is circular and is defined by a cylindrical surface 94. Each opening 92 has a second diameter D2, where D1<D2.

Four of the lamination segments 20F can be abutted along their radially extending edges to form a first annular lamination 96. Similarly, four of the lamination segments 20G can be abutted along their radially extending edges to form a second annular lamination 98. A plurality of annular laminations 96, 98 can then be stacked together to form an assembled stator core that is compressed, optionally heat-treated, impregnated with a resin material using a VPI process and subsequently cured.

Figure 30:
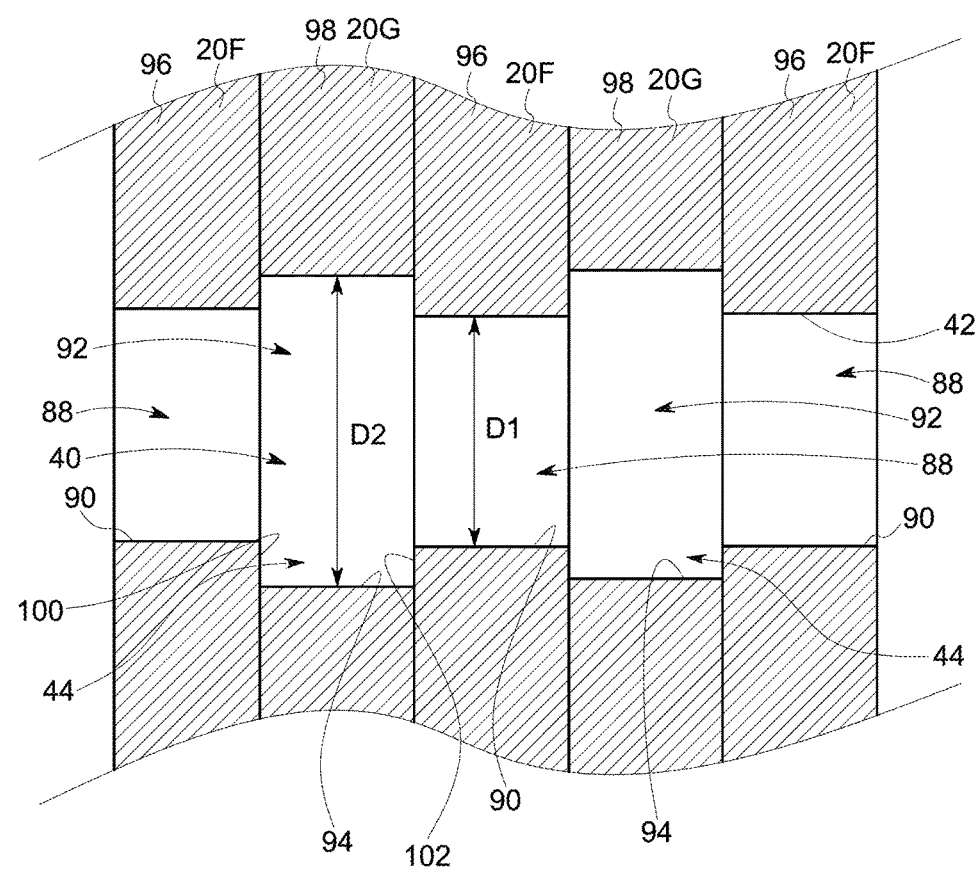
FIG. 30 is a cross section view of a plurality of stacked first and second lamination segments of FIGS. 26 and 28 before VPI and curing processes.

FIG. 30 shows part of a plurality of annular lamination 96, 98 stacked together before the stator core undergoes the VPI and curing processes. The first annular laminations 96 are stacked alternately with the second annular laminations 98. Each first annular lamination 96 includes four lamination segments 20F but only part of one is shown and each second annular lamination 98 includes four lamination segments 20G but only part of one is shown.

The openings 88, 92 in the first and second annular laminations 96, 98 are coaxially aligned to form axially extending coolant passageways 40. Only part of one of the coolant passageways 40 is shown in FIG. 30.

The cylindrical surface 42 of each coolant passageway 40 is defined by the cylindrical surfaces 90 of the first annular laminations 10F.

It can also be seen that a plurality of axially spaced sealing recesses 44 are formed between each pair of first annular laminations 96. Each sealing recess 44 is defined by the cylindrical surface 94 of the interposing second annular lamination 98 (which cylindrical surface 94 defines an end surface of the sealing recess) and annular planar surfaces 100, 102 of the adjacent first annular laminations 96 that extend radially inwardly of the cylindrical surface 94. The surfaces 94, 100 and 102 are therefore the so-called 'recess-defining surfaces' mentioned above.

The axial width of each sealing recess 44 is determined by the thickness of the second annular laminations 98 and can be between about 0.1 mm and about 2 mm. The first diameter D1 can be between about 2 mm and about 200 mm. The second diameter D2 can be between about 0.2 mm and about 20 mm larger than the first diameter D1. It will therefore be readily appreciated that the sealing recesses 44 are shown exaggerated in the drawings for clarity.

Figure 31:
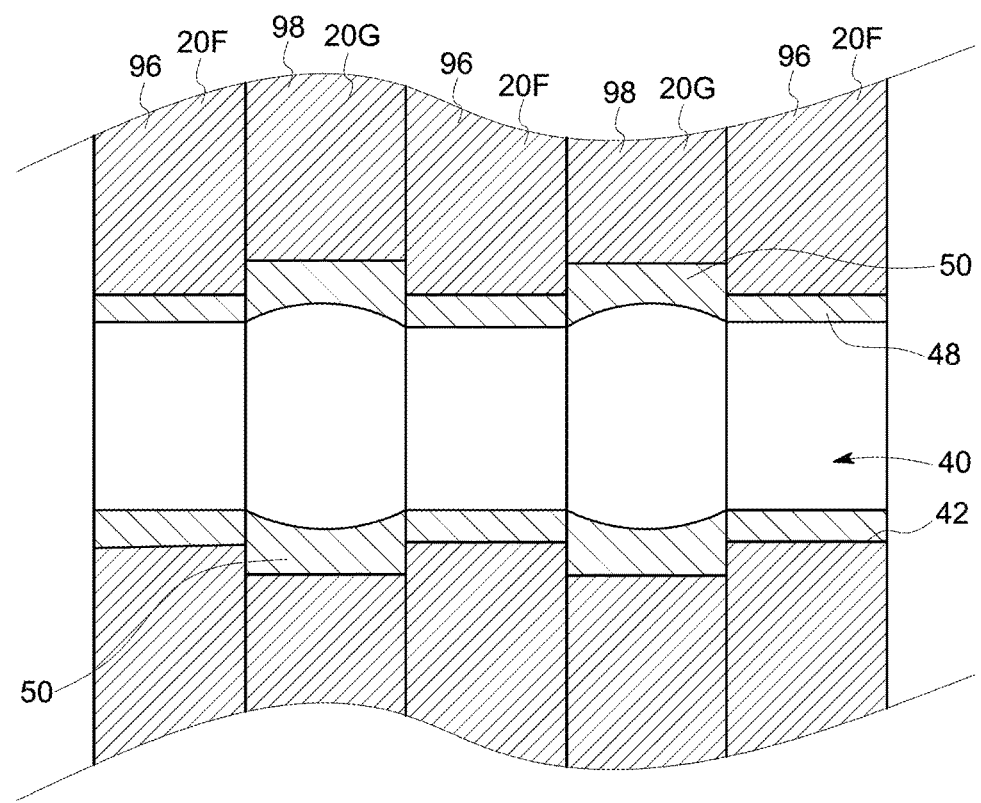
FIG. 31 is a cross section view of the plurality of stacked first and second lamination segments of FIG. 30 after VPI and curing processes.

With reference to FIG. 31, after the VPI and curing processes, the cylindrical surface 42 of the coolant passageway 40 is coated with a continuous layer 48 of cured resin material 48. The layer of cured resin material extends into the sealing recesses 44 to define axially spaced annular seals 50. Although not shown, the resin material impregnated during the VPI process will also extend into the narrow gaps or voids between the facing planar surfaces 34, 46 of axially adjacent annular laminations 96, 98 that are caused by localised deformities or irregularities in the individual laminations.

In the arrangement shown in FIGS. 30 and 31, only one second annular lamination 98 is interposed between each pair of first annular laminations 96. But it will be readily appreciated that two or more second annular laminations can be interposed between each pair of first annular laminations, thereby increasing the axial width of each sealing recess. Such an arrangement can be particularly useful for resin material with a very high viscosity. Finally, it might be considered that the arrangement shown in FIG. 30 is merely an extreme case of the arrangement shown in FIG. 18, i.e., where the first and second recessed areas extend across the full axial width of the annular lamination 10.

What is claimed is:

1. A stator for an electrical machine comprising:
    a plurality of axially adjacent generally annular laminations;
    a substantially axially extending coolant passageway through which a coolant fluid flows in use, and a plurality of axially spaced sealing recesses;
    wherein each sealing recess is in open communication with the surface of the axially extending coolant passageway, has an axial width greater than the gap between the facing planar surfaces of axially adjacent laminations, and is at least partially filled with a cured resin material that defines a plurality of axially spaced seals.

2. A stator according to claim 1, wherein the sealing recesses are annular sealing recesses that extend completely around the surface of the coolant passageway, and wherein the seals are annular seals.

3. A stator according to claim 1, wherein the coolant passageway is defined by axially aligned openings in the annular laminations.

4. A stator according to claim 3, wherein at least some of the annular laminations include a first recessed area formed in a first planar surface of each respective annular lamination and surrounding the opening, each recessed area defining a sealing recess in the stator.

5. A stator according to claim 4, wherein the plurality of laminations are stacked in the same orientation.

6. A stator according to claim 4, wherein at least some of the annular laminations include a second recessed area formed in a second planar surface of each respective annular lamination and surrounding the opening, each second recessed area defining a sealing recess in the stator.

7. A stator according to claim 6, wherein the annular laminations that include the second recessed area are stacked with other annular laminations that include openings but no recessed areas.

8. A stator according to claim 4, wherein each recessed area is defined by a substantially planar surface that is recessed relative to the respective planar surface of the remainder of the annular lamination, a substantially frusto-conical surface, a substantially angled surface, or by a combination thereof.

9. A stator according to claim 1, further comprising first and second compression plates, and wherein a sealing recess is provided between an end annular lamination and an adjacent compression plate.

10. A stator according to claim 3, wherein the stator comprises a plurality of first annular laminations having a first opening and a plurality of second annular laminations having a second opening larger than the first opening.

11. A stator according to claim 10, wherein the first and second annular laminations are stacked alternately such that the first and second openings are axially aligned and define the coolant passageway and the plurality of axially spaced sealing recesses.

12. A stator according to claim 10, wherein each sealing recess is defined between a pair of first annular laminations with one or more second annular laminations interposed between the pair of first annular laminations.

13. A stator according to claim 10, wherein the first openings define the surface of the coolant passageway and the second openings define end surfaces of the sealing recesses.

14. An annular lamination of a stator core comprising:
    at least one opening defining a part of an axially extending coolant passageway and a first recessed area formed in a first planar surface of the annular lamination and surrounding the opening, the first recessed area defining a sealing recess, the sealing recess is in open communication with a surface of the axially extending coolant passageway, and has an axial width greater than the gap between the first planar surface of the annular lamination and a planar surface of an axially adjacent annular lamination, and is at least partially filled with a cured resin material that defines a plurality of axially spaced seals; and
    wherein the annular lamination adapted to be stacked together with other annular laminations to form the stator core.

15. An annular lamination according to claim 14, further comprising a second recessed area formed in a second planar surface of the annular lamination and surrounding the opening.

16. A method of manufacturing a stator for an electrical machine, the method comprising the steps of:
    stacking a plurality of axially adjacent generally annular laminations to form a stator core, the stator core comprising an axially extending coolant passageway through which a coolant fluid flows in use, and a plurality of axially spaced sealing recesses, wherein each sealing recess is in open communication with the surface of the axially extending coolant passageway, and has an axial width greater than the gap between the facing planar surfaces of axially adjacent laminations;
    subjecting the stator core to a vacuum pressure impregnation process such that the axially spaced sealing recesses are at least partially filled with resin material; and curing the resin material to define a plurality of axially spaced seals in the stator core.

* * * * *